United States Patent [19]

Azumada et al.

[11] 4,165,992
[45] Aug. 28, 1979

[54] PASTE MATERIAL AS THE CARRIER INGREDIENT OF PASTE FOR PASTING CORRUGATED CARDBOARD AND THE PROCESS FOR PREPARING THE SAME

[75] Inventors: Koichi Azumada; Michio Kobori, both of Kashihara, Japan

[73] Assignee: Shunichi Morimoto, Kashihara, Japan

[21] Appl. No.: 829,813

[22] Filed: Sep. 1, 1977

[30] Foreign Application Priority Data

Jun. 22, 1977 [JP] Japan .................................. 52-74255

[51] Int. Cl.² .............................................. C08L 3/02
[52] U.S. Cl. .................................... 106/210; 106/213
[58] Field of Search .................. 106/210, 213; 536/50, 536/47, 106; 260/348.44

[56] References Cited

U.S. PATENT DOCUMENTS

| | | | |
|---|---|---|---|
| 2,051,025 | 8/1936 | Bauer | 106/157 |
| 2,102,937 | 12/1937 | Bauer | 106/157 |
| 2,212,557 | 8/1940 | Bauer | 106/157 |
| 3,278,561 | 10/1966 | Gaertner | 260/348.44 |
| 3,448,101 | 6/1969 | Billy et al. | 536/50 |
| 3,802,897 | 4/1974 | Voigt et al. | 106/213 |

*Primary Examiner*—Theodore Morris
*Attorney, Agent, or Firm*—Tilton, Fallon, Lungmus & Chestnut

[57] ABSTRACT

Paste material as the carrier ingredient of paste for pasting corrugated cardboard contains chemically processed starch manufactured by making N.N-diglycidylaniline or N.N-diglycidyl-O-toluidine be contact-absorbed into starch and then heating and roasting the same.

3 Claims, 3 Drawing Figures

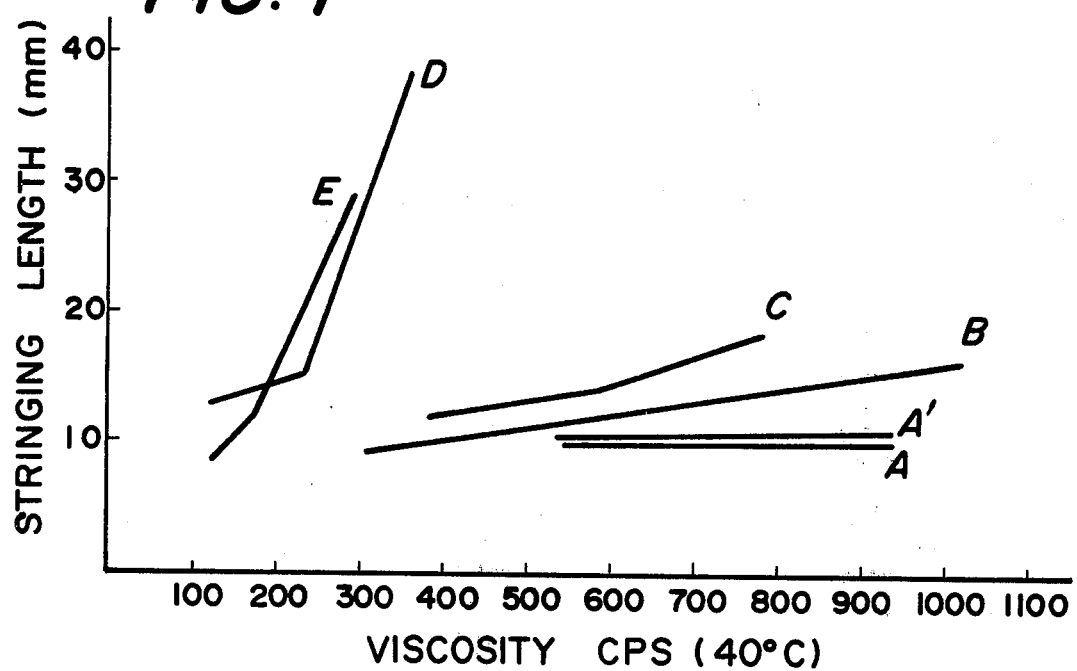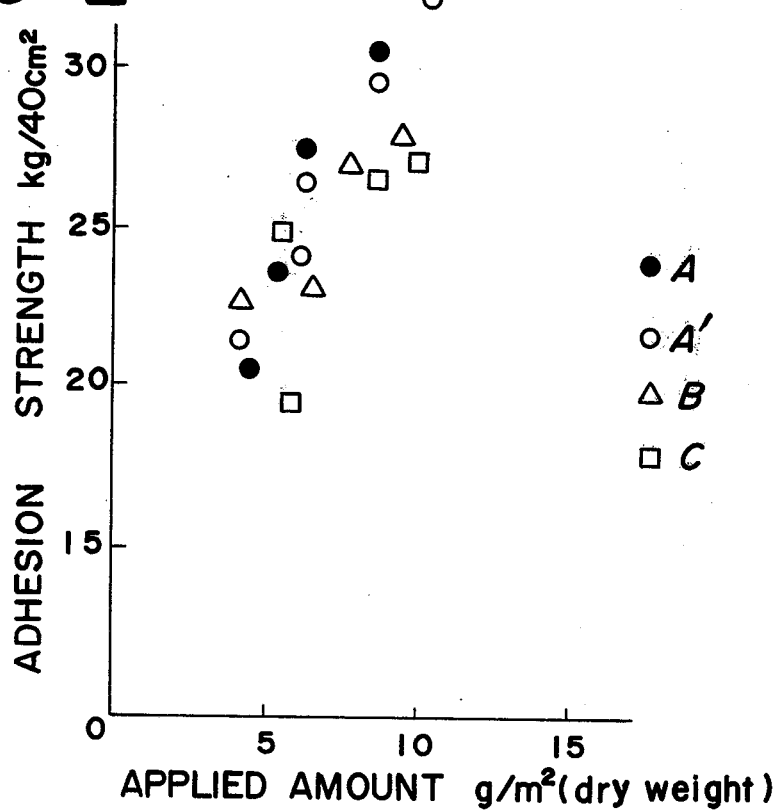

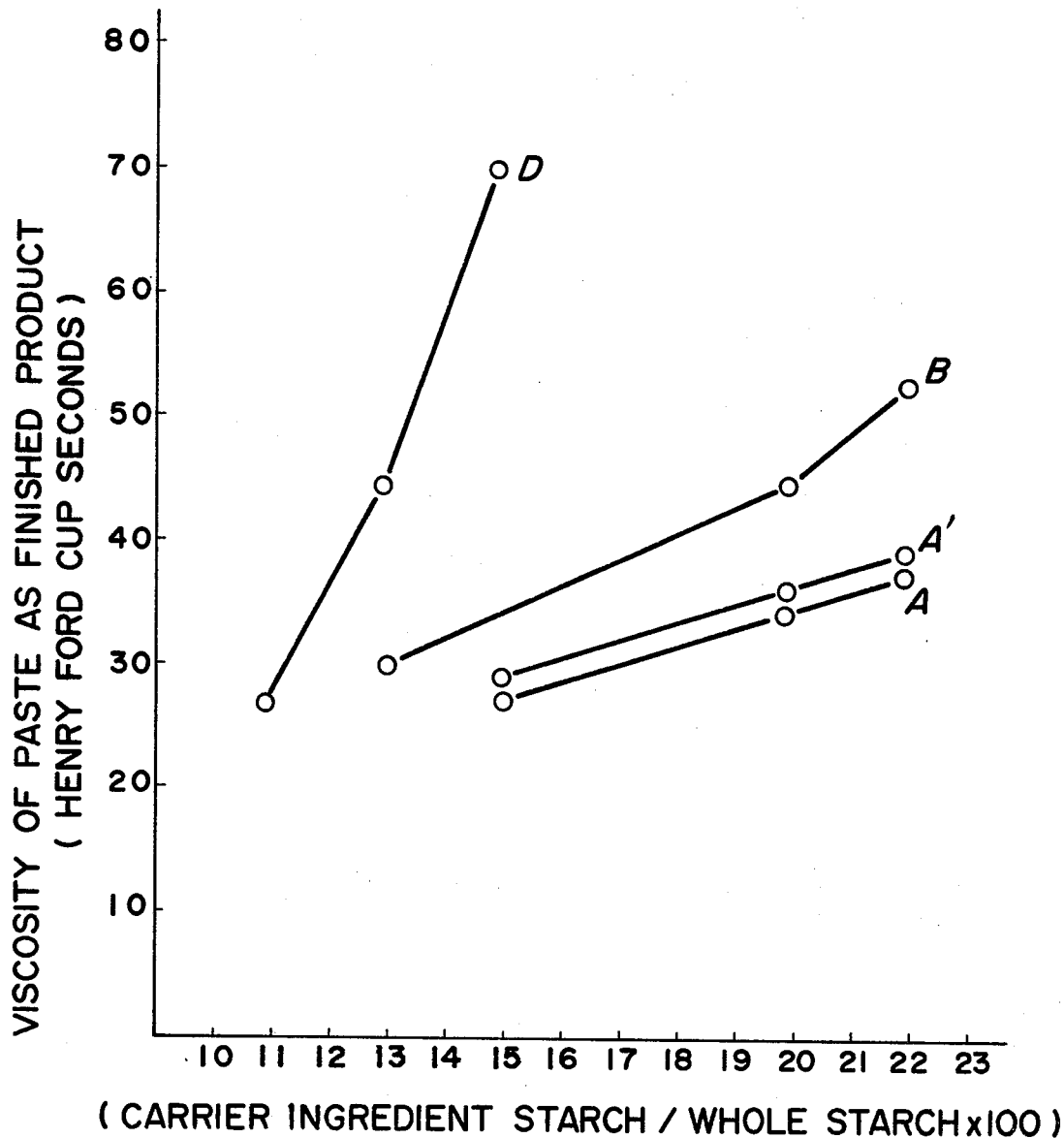

PASTE MATERIAL AS THE CARRIER INGREDIENT OF PASTE FOR PASTING CORRUGATED CARDBOARD AND THE PROCESS FOR PREPARING THE SAME

The present invention relates to paste material used as the carrier ingredient of an adhesive for pasting corrugated cardboard, particularly to a composition of an adhesive suitable for pasting corrugated cardboard by means of a high speed pasting machine in which a gravure roll is used. At present, for pasting corrugated cardboard, paste containing starch as the main ingredient manufactured by Stein, Hall method is most conventionally used. Such paste usually comprises paste materials as the carrier ingredient and the main ingredient, and natural starch e.g. wheat starch, cornstarch, tapioca starch or the like has been usually used as raw material for both of the carrier and main ingredients of paste. The carrier ingredient of paste for pasting corrugatd cardboard has functions of promoting the dispersion of the main ingredient as well as of preventing the precipitation thereof. Therefore, the carrier ingredient of paste is required to have high viscosity and further to be minimized in amount in the paste so that the proportion of the main ingredient may be as large as possible so as to raise the adhesion of the paste. In this case, however, since it is necessary to gelatinize a large amount of ungelatinized starch, the amount of used water becomes necessarily large and the more heat quantity is required, thus often causing lack of heat, curl of the cardboard and other difficulties. On the other hand, pasting machines for manufacturing corrugated cardboard have recently become larger and larger in size, as well as pasting speed thereof becoming higher and higher. That is, in the art concerned, corrugated cardboard pasting by the conventional smooth roll system has become rapidly abolished and replaced by gravure roll system. Such recent progress of corrugated cardboard pasting machines demands new properties of paste to be used as well as new functions of the carrier ingredient of paste as adhesive.

It is known that the carrier ingredient of paste used in high speed pasting by means of a high speed gravure roll pasting machine or the like has an important effect in the early stage of pasting and is indispensable for the increase of pasting strength. According to this knowledge, the higher the pasting speed is, the proportion of the carrier ingredient in the paste is required to be larger, and therefore the carrier ingredient of paste must have a low viscosity and exhibit an excellent pasting ability especially in the initial stage of pasting. Further, the carrier ingredient of paste having a low viscosity can provide paste applicable with small amount of water, thus eliminating the curl of cardboard due to lack of water, insufficient pasting or other difficulties as well as permitting the increase of the pasting rate. In fact, it has been proved that in a corrugated cardboard pasting machine provided with a large-sized high speed gravure roll, sufficient pasting of corrugated cardboard cannot be achieved by using conventional paste made of various kinds of natural starches as raw material. Many kinds of pastes for pasting corrugated cardboard have been proposed, but no practicable pastes have been developed yet at present.

According to the inventors' finding, properties required for paste (adhesive) to be used in a corrugated cardboard pasting machine provided with a large-sized high speed gravure roll (hereinafter referred to as a gravure roll pasting machine) are as follows.

(a) Low stringiness.

(b) Starch as the carrier ingredient of paste being of low viscosity and contained in a large proportion in the paste, and water used in the carrier ingredient being small in amount.

(c) The gelatinization temperature being low within a practical range.

(d) Viscosity being stable relative to stirring.

(e) Excellent adhesion.

(f) Time from the beginning to the end of the gelatinization being short.

(g) Low cost.

(h) Excellent water retaining property.

(i) The carrier ingredient having an excellent property of retaining raw starch particles of the main ingredient in a dispersed state in the carrier ingredient.

(j) Low foaming of the emulsion and the paste solution.

However, any one of the conventional pastes (adhesives) for pasting corrugated cardboard containing as the carrier ingredient chemically processed starch, starch having genetically special molecular composition or chemically processed product thereof has been proved not to perfectly fulfill the abovementioned requirements. The paste containing as the carrier ingredient recently developed genetically special starch of high content of amylose(hyamylose starch) or chemically processed product thereof has been proved to be suitable for use in a gravure roll pasting machine, but it costs extremely high and is hard to be industrially used. In view of the above, the object of the present invention is to provide paste for pasting corrugated cardboard of a low cost and high quality, especially chemically processed starch suitable for use as the carrier ingredient of said paste and a process for preparing the same. Further, another object of the present invention is to provide a corrugated cardboard adhesive (paste for pasting corrugated cardboard) suitable for use in a gravure roll pasting machine and of a low cost. These objects of the present invention can be achieved by an adhesive(adhering paste) according to the present invention comprising paste material as the carrier ingredient according to the present invention and the conventional starches as the main ingredient. The paste material as the carrier ingredient according to the present invention is characterized in that it contains as the main substance chemically processed starch obtained by allowing N.N-diglycidylaniline or N.N-diglycidyl-O-toluidine and preferably a surface active agent to be contact-absorbed into starch and heating and roasting the same. The kind of starch used as the raw material of the product according to the present invention is not especially limited, and the preferred examples are sweet potato starch, wheat starch, cornstarch, potato starch, tapioca starch and the like.

Particularly preferred starch as the raw material is cornstarch.

Each of N.N-diglycidyl-aniline and N.N-diglycidyl-O-toluidine used according to the present invention has the following structural formula and is sold as an epoxy reactive diluent on the market.

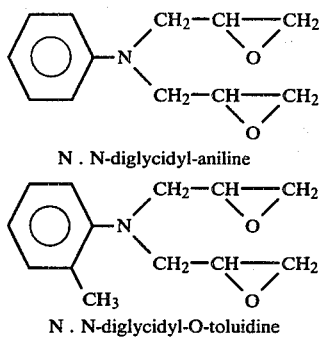

N . N-diglycidyl-aniline

N . N-diglycidyl-O-toluidine

The amount of each of these diepoxides added to starch as the raw material(dry weight) is usually in a range of 0.005–10%, preferably 0.01–3%.

By the way, the inventors have reached the conclusion that these diepoxides can perfectly fulfill the abovementioned requirements relating to paste properties, after an earnest study on other diepoxides and the like as well as the abovementioned.

Preferable surface active agents used in the present invention are mainly nonionic surface active agents and the preferable examples are fatty acid monoglyceride, polyoxyethylene alkylether, polyoxyethylene alkylphenolether, sorbitan fatty acid ester, sorbitan fatty acid ester of polyoxyethylene and others.

These surface active agents are added in the amount of about 0.005–0.3% to starch. Such a surface active agent is added for the purpose of eliminating water repellency of the product and therefore it may be added directly to the chemically processed starch product.

Now, the present invention will be described in more detail. The said starch as the raw material is adjusted as water-dispersed emulsion, starch cakes containing a large amount of water or dry starch. Then, the step of adding the abovementioned diepoxide and optionally an agent or agents e.g. surface active agent to the starch as raw material is carried out. In this step, if the starch is in the form of an emulsion, an agent is added and the mixture is sufficiently stirred and mixed while in case of the starch in the form of cake or dry powder, the said agent is preferably added by spraying with sufficiently stirring and mixing the starch. With the starch in any form, it is essentially in this step to sufficiently contact and mix the starch and the agent with each other. Thus obtained mixed emulsion of the agent and the starch or starch cake is subject to dehydrating and drying treatment in a conventional manner. In case of dry starch mixed with the agent, it is subject to the subsequent heating and roasting treatment directly or after some pre-drying. The heating and roasting treatment may comprise thin shelf type heating, contacting and heating treatment with mixing and stirring or any other heating system, but desirably each particle of the starch is uniformly heated. The heating temperature is in the range of 100°–250° C., preferably 110°–150° C. and each optimum temperature is suitably selected according to the kind and the like of the used agent. The heating time varies depending upon the heating temperature, the kind of the agent and the like, and sometimes it is as long as from 3 hours to more than 20 hours.

The conditions in the roasting treatment i.e. the roasting temperature and time is required to be selected so as to allow the starch to be converted into dextrin at least to a considerable extent, in view of the fulfillment of each of the abovementioned requirements relating to the properties of the paste for pasting corrugated cardboard, especially the requirement (b). And the present invention is based also on this finding.

The paste for pasting corrugated cardboard containing the paste material as the carrier ingredient according to the present invention having the abovementioned structure shows such an excellent property as fulfilling the abovementioned requirements (a) to (j), which can be easily understood from the following Examples described with reference to the appended drawings, in which:

FIG. 1 is a graph illustrating the relation between the stringing length and the viscosity;

FIG. 2 is a graph relating to the adhesion strength; and

FIG. 3 is a graph illustrating the relation between the ratio of the amounts of the carrier ingredient starch and the main ingredient starch, and the viscosity of the paste.

EXAMPLE 1

1 kg of cornstarch powder containing 13% of water was sufficiently stirred while 1.25 g of N.N-diglycidyl aniline(epoxy relative diluent GAN manufactured by Nippon Kayaku Co., Ltd.) was added by spraying thereto. By sufficiently stirring and mixing for about 30 minutes, the agent was sufficiently contact-absorbed into the starch.

This mixture of the agent and the starch was spread on an aluminum plate to form a layer of 20 mm thickness and placed into a hot blast circulation drier. The temperature in the drier was kept at 137° C. for 4 hours. After the completion of the heating treatment, the temperature was dropped to room temperature. Then the water content of the product was below 1%. 130 g of water was added thereto and sufficiently mixed to make the water content to 13%. This product was hereinafter referred to as Carrier ingredient starch No. 1.

GAN(trade name) used in this Example had the following characteristics.

|  | GAN |
|---|---|
| appearance | brown transparent solution |
| epoxy equivalent weight | 125–145 |
| viscosity (25° C.) | 50–100 cps |
| hue (Gardner method) | 4–7 |
| specific gravity (25° C.) | 1.14 1.14 |
| boiling point | 160° C. (5mm Hg) |

The paste for pasting corrugated cardboard is manufactured by the following method. The standard formulation is as shown in Table 1 below.

Table 1

|  | carrier ingredient | | total amount | (% with respect to paste solution) |
|---|---|---|---|---|
| water | 326 | 571 | 897 | (76.75) |
| starch* | 57.2 | 202.8 | 260 | (22.24) |
| caustic soda | 6.7 | — | 6.7 | (0.57) |
| borax | — | 5.2 | 5.2 | (0.44) |
| water/starch | 5.7 | 2.8 | 3.45 |  |
| caustic soda/ starch % | 11.7 | — | 2.58 |  |
| borax/starch % | — | 2.6 | 2.0 |  |
| main weight/ |  |  | 2.00 |  |

Table 1-continued

| | carrier ingredient | total amount (% with respect to paste solution) |
|---|---|---|
| carrier weight main water/ carrier water | | 1.75 |
| carrier starch/ whole starch % | | 22.0 |
| carrier starch/ whole water % | | 6.38 |

*Carrier ingredient starch No. 1 is used for the carrier ingredient and conventional cornstarch for the main ingredient.

The paste was manufactured as shown in Table 2 below.

Table 2

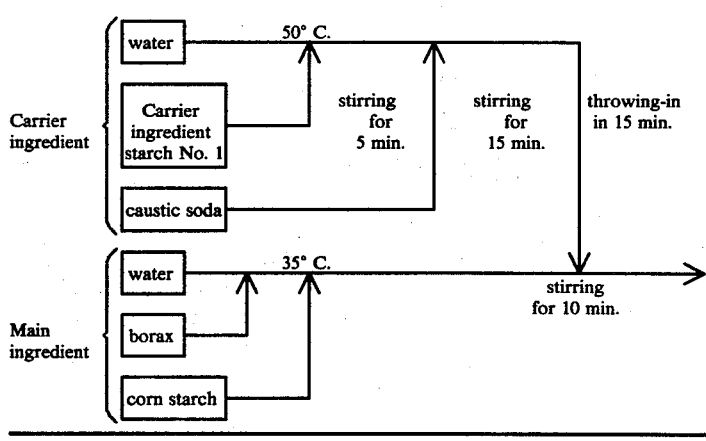

Then the manufactured paste was examined on its properties as paste for pasting corrugated cardboard by the abovementioned method.

Paste suitable for use in a gravure roll corrugated cardboard pasting machine is required to have a low stringiness. Further, it is essential that the stringiness does not change even if the viscosity of the paste somewhat changes. FIG. 1 illustrates the relation between the stringiness and the viscosity. A indicates the paste manufactured in the Example 1. However, only the ratio of the amounts of the main ingredient starch and the carrier ingredient starch was changed to obtain paste solutions of different viscosities. B is paste in which chemically processed hyamylose cornstarch is used for the carrier ingredient. C is paste in which a mixture of equal amount of cornstarch and hyamylose cornstarch is used for the carrier ingredient. And E is paste in which chemically processed starch sold on the market as paste for use in a gravure roll corrugated cardboard pasting machine. B, C, D and E are all used at present as pastes for pasting corrugated cardboard, but paste A prepared in Example 1 has the lowest stringiness and the stringiness shows a least change relative to the viscosity. That is, paste A has proved to be the most excellent in respect of the stringiness in comparison with the conventional starch pastes. The stringiness was measured using Tensilon universal tensilometer UTA-4 type manufactured by Toyo Measuring Equipment Co., Ltd. An electrode is inserted into the paste and the electric circuit is closed between the paste and the electrode, and the paste and the electrode are separated away at a rate of 1,000 mm/min. The circuit is so arranged that the paste is pulled and the string-shaped portion is broken, the current is cut to stop the device. The distance between the end face of the paste and the electrode was measured as the stringing length (mm). To measure the strength of adhesion, a pin adhesion test was carried out in a conventional manner using the abovementioned universal tensilometer. The results of the measurement of the adhesion are shown in FIG. 2.

A is paste manufactured according to the present invention, while B is paste manufactured using hyamylose cornstarch and D manufactured using conventional cornstarch. The paste according to the present invention is apparently excellent also in the strength of adhesion.

In the formulations shown in Table 1, pastes were manufactured by changing the ratio of the amounts of the main ingredient starch and the carrier ingredient starch. The change of the viscosity then is shown in FIG. 3. A is paste manufactured in this Example with changing only the ratio of the amounts of the main and carrier ingredient starches.

B is manufactured by using hyamylose starch and D using the conventional starch. The conventional starch cannot provide the required viscosity unless the paste contains a small amount of the carrier ingredient starch. That is, the carrier ingredient starch cannot be used in an amount of only 10% of the main ingredient starch. However, in the paste according to the present invention, the carrier ingredient starch can be used in an amount of 20% of the main ingredient starch. In case of hyamylose cornstarch, the usable amount of the carrier ingredient is intermediate between those of the conventional cornstarch and the paste according to the present invention. Referring to FIG. 3, the paste according to the present invention has the lowest viscosity and permits the largest amount of the carrier ingredient starch to be used, thereby entirely fulfilling the requirements of the modern type of gravure roll pasting machine. Further, the paste according to this embodiment is excellent in viscosity stability relative to mechanical shearing force as well as in water retaining property, and also has an excellent property of retaining raw starch particles of the main ingredient in a dispersed state in the carrier ingredient and other properties. In Table 3, there are shown the data on the viscosity stability of the paste of this example, and in Table 4, the reference data in which cornstarch is used as the carrier ingredient(when the amounts of the carrier ingredient starch and the main ingredient starch were 31.6 g and 228.4 g respectively in the formulation of Table 1).

Table 3

| time | 0 | 1 | 3 | 15 | 20 | 22 | 40 | 42 | 46 | 48 |
|---|---|---|---|---|---|---|---|---|---|---|
| HENRY FORD CUP viscosity (sec) | 36 | 36 | 36 | 35 | 35 | 35 | 36 | 35 | 35 | 35 |
| B type viscosity (cps) | 1000 | 1000 | 1000 | 1000 | 1000 | 1000 | 960 | 980 | 900 | 940 |
| stirring | | | stirred 1000 rpm | | | allowed to stand | | stirred 1000 rpm | | |

*measured at 40° C.

Table 4

| time | 0 | 1 | 2 | 3 | 15 | 20 | 22 | 40 | 42 | 46 | 48 |
|---|---|---|---|---|---|---|---|---|---|---|---|
| HENRY FORD CUP viscosity (sec) | 70 | 32 | 26 | 24 | 21 | 20 | 20 | 20 | 19 | 18 | 18 |
| B type viscosity (cps) | 410 | 360 | 310 | 280 | 260 | 250 | 240 | 240 | 220 | 210 | 210 |
| stirring | | | stirred 1000 rpm | | | | allowed to stand | | stirred 1000 rpm | | |

*measured at 40° C.

EXAMPLE 2

Chemically processed starch was manufactured similarly to Example 1 except that the following composition of agents was used and the roasting condition was at a temperature of 120° C. and for 5 hours. The obtained chemically processed starch was very useful as the carrier ingredient starch, showing substantially the same characteristics with those of Example 1.

Further, similarly to Example 1, paste was manufactured using this chemically processed starch and subject to examination of its characteristics the results of which are shown in FIGS. 1 and 3 with the designation A'.

COMPOSITION OF AGENTS

N.N-diglycidyl-O-toluidine(epoxy reactive diluent GOT manufactured by Nippon Kayaku Co., Ltd.): 1.5 g
Surface active agent(Emulgen 911 manufactured by Kao Atlas Co., Ltd.): 0.2 g The epoxy reactive diluent GOT(trade name) used had the following characteristics.

|  | GOT |
|---|---|
| appearance | light yellow transparent liquid |
| epoxy equivalent weight | 125–145 |
| viscosity (25° C.) | 30–50 cps |
| hue (Gardner method) | 2–4 |
| specific gravity (25° C.) | 110 |
| boiling point | 145° C. (5mm Hg) |

What is claimed is:

1. In a paste composition for pasting a corrugated cardboard by a high-speed gravure roll pasting machine and prepared by mixing a carrier paste of pre-gelatinized starch with a main paste of non-gelatinized starch, the improvement comprising: said carrier paste including a chemically processed starch manufactured by making 0.01–3% by weight of N.N-diglycidyl-aniline or N.N-diglycidyl-O-toluidine be contact-absorbed into a natural starch and then heating and roasting the resultant mixture at a temperature in the range of 100°–250° C., and preferably, of 110°–150° C.

2. The composition of claim 1 in which said carrier paste further including 0.005–0.3% by weight of non-ionic surface-active agent based on the dry-weight of the natural starch.

3. The composition of claim 1 in which said natural starch is a cornstarch.

* * * * *